(12) United States Patent
Spurgeon et al.

(10) Patent No.: US 10,803,422 B2
(45) Date of Patent: Oct. 13, 2020

(54) SYSTEM AND METHOD FOR TRACKING AN EMPLOYEE'S TIME

(71) Applicant: Senior Match Solutions Corp., Austin, TX (US)

(72) Inventors: Chris Spurgeon, Austin, TX (US); Lawrence Hugh Maze, Austin, TX (US); Bryan Oden, Austin, TX (US)

(73) Assignee: Senior Match Solutions Corp., Austin, TX (US)

( * ) Notice: Subject to any disclaimer, the term of this patent is extended or adjusted under 35 U.S.C. 154(b) by 188 days.

(21) Appl. No.: 16/111,358

(22) Filed: Aug. 24, 2018

(65) Prior Publication Data

US 2019/0066058 A1 Feb. 28, 2019

Related U.S. Application Data

(60) Provisional application No. 62/549,540, filed on Aug. 24, 2017.

(51) Int. Cl.
*G06Q 10/10* (2012.01)
*G06Q 40/00* (2012.01)

(52) U.S. Cl.
CPC ....... *G06Q 10/1091* (2013.01); *G06Q 40/125* (2013.12)

(58) Field of Classification Search
CPC ........... G07C 1/10; G06Q 40/00; G06Q 10/00
USPC ...................................................... 705/32
See application file for complete search history.

(56) References Cited

U.S. PATENT DOCUMENTS

| | | | | |
|---|---|---|---|---|
| 8,788,375 B2 * | 7/2014 | Podgurny | .............. | G06Q 10/06 705/32 |
| 9,013,333 B2 * | 4/2015 | Morgan | .................. | G08G 1/207 340/539.13 |
| 9,020,848 B1 * | 4/2015 | Ridge | .................. | G06Q 40/125 705/32 |
| 9,202,250 B1 * | 12/2015 | Palaniappan | ........ | G06Q 40/125 |
| 9,384,665 B2 * | 7/2016 | Morgan | .................. | G08G 1/207 |
| 10,210,482 B2 * | 2/2019 | Smith | ................... | H04W 4/029 |
| 10,467,564 B2 * | 11/2019 | Hull | ...................... | H04W 4/029 |
| 2006/0284838 A1 * | 12/2006 | Tsatalos | ............. | G06Q 10/0637 345/156 |
| 2011/0320230 A1 * | 12/2011 | Podgurny | ........ | G06Q 10/06311 705/7.13 |
| 2011/0320231 A1 * | 12/2011 | Podgurny | .............. | G06Q 50/28 705/7.13 |
| 2012/0089493 A1 * | 4/2012 | Podgurny | .............. | G06Q 10/06 705/32 |
| 2013/0090968 A1 * | 4/2013 | Borza | .................... | G06Q 10/06 705/7.16 |

(Continued)

*Primary Examiner* — Oluseye Iwarere
(74) *Attorney, Agent, or Firm* — Maze IP Law, P.C.

(57) ABSTRACT

A system for tracking an employee's time comprises a geographic location aware device able to detect a presence within a geo-fence area in real time, create a time and location message when the real time geographic location detector enters into or departs from the geo-fence area; and transmit those messages to a remote tracker which may be at one or a plurality of remote locations. The remote tracker comprises software that calculates a time differential between the arrival time and the departure time and uses the calculated time differential to calculate a gross pay for the employee at a predetermined rate of pay.

19 Claims, 1 Drawing Sheet

(56) References Cited

U.S. PATENT DOCUMENTS

| | | | |
|---|---|---|---|
| 2014/0249877 A1* | 9/2014 | Hull | G06Q 10/063114 |
| | | | 705/7.15 |
| 2015/0161553 A1* | 6/2015 | Eggleston | H04W 4/021 |
| | | | 705/7.15 |
| 2015/0327011 A1* | 11/2015 | Fairbanks | G06Q 10/10 |
| | | | 455/456.3 |
| 2015/0348214 A1* | 12/2015 | Jain | G06Q 40/125 |
| | | | 705/14.58 |
| 2016/0042470 A1* | 2/2016 | Shaaban | G06F 21/62 |
| | | | 705/30 |
| 2016/0063446 A1* | 3/2016 | Shaaban | G06Q 30/04 |
| | | | 705/32 |
| 2016/0180295 A1* | 6/2016 | Smith | H04W 12/08 |
| | | | 705/32 |
| 2017/0004550 A1* | 1/2017 | Shaaban | G06F 21/62 |
| 2017/0069036 A1* | 3/2017 | Shaaban | G06Q 10/06 |
| 2017/0154395 A1* | 6/2017 | Podgurny | G06Q 10/06311 |
| 2017/0178208 A9* | 6/2017 | Shaaban | G06Q 20/405 |
| 2018/0278462 A1* | 9/2018 | Bjontegard | A63F 13/213 |
| 2018/0330327 A1* | 11/2018 | Hertenstein | H04W 4/021 |
| 2019/0057340 A1* | 2/2019 | Wang | G06F 16/29 |
| 2019/0279179 A1* | 9/2019 | Shaaban | G06Q 20/102 |
| 2019/0380002 A1* | 12/2019 | Phillips | G08B 21/0236 |
| 2020/0042936 A1* | 2/2020 | Jain | G06F 40/14 |

* cited by examiner

SYSTEM AND METHOD FOR TRACKING AN EMPLOYEE'S TIME

RELATIONSHIP TO PRIOR APPLICATIONS

This application claims priority through U.S. Provisional Application 62/549,540 titled "A System And Method For Tracking An Employee's Time," filed Aug. 24, 2017.

BACKGROUND OF THE INVENTION

Employees and contracted third-parties employed by an organization may actually work at a work site distant from the employer. Often, the organization needs to keep accurate track of actual hours worked by such employees but must also rely on non- or partially accurate verification methods. Possibilities exist that such time tracking may therefore be inaccurate.

Moreover, the organization, employees, and third party employers also may not have access to timely reports as such data collection and reporting can be delayed.

FIGURES

The figures supplied herein illustrate various embodiments of the invention.

Figure 1:
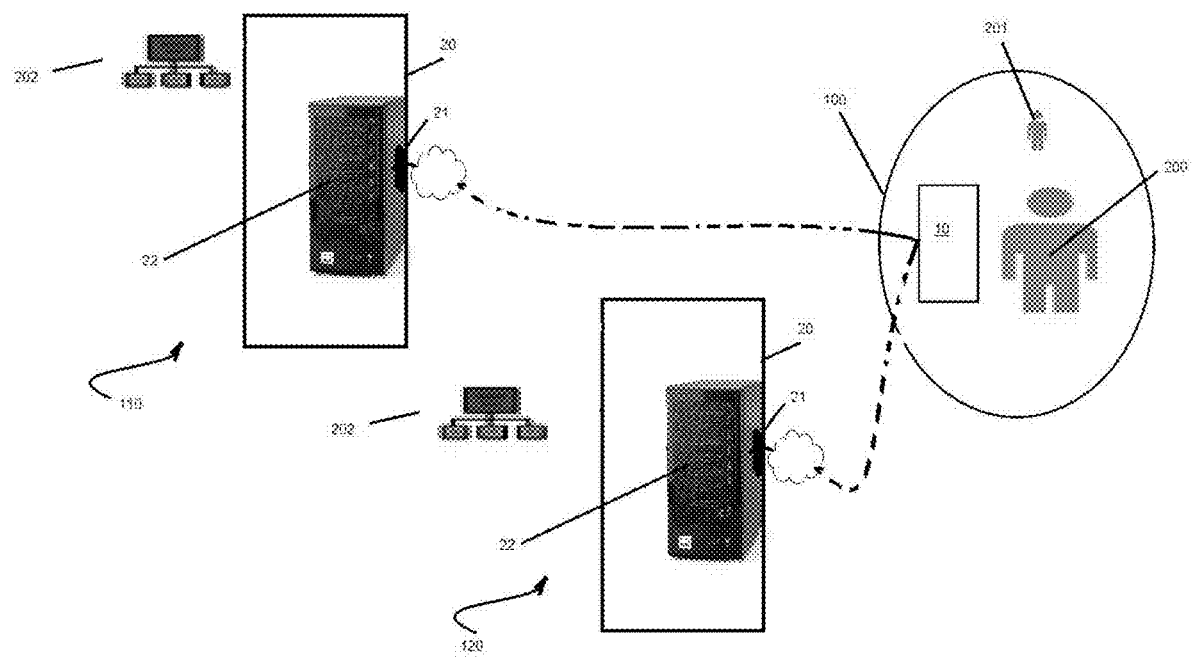
Figure 2:
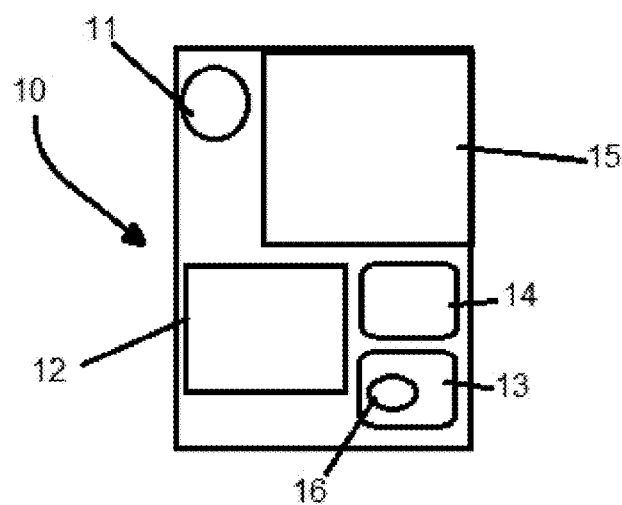

FIG. 1 is a schematic view of an exemplary a system for tracking an employee's time; and FIG. 2 is a front view in partial perspective of an exemplary geographic location aware device.

BRIEF DESCRIPTION OF EMBODIMENTS

As used herein, a "geo-fence" is a virtual perimeter for a real-world geographic area in a two- or three-dimensional geographic space and can be dynamically generated such as in a radius around a point location or can be a predefined set of boundaries such as school zones or neighborhood boundaries.

As used herein, a "geographic location aware device" is one can detect its geographic location in real time, such as with a GPS location sensor, and is further capable of determining its existence within or outside a geo-fence using the GPS/location of the geographic location aware device, e.g. a smart phone or computer such as a laptop or tablet.

As used herein, a "schedule" may comprise single day, week, or "month at a glance" information for an employee. In certain embodiments, schedule data may comprise a user selectable link to a predetermined set of employer information for a selected day, e.g. an employer name, an employer geographic location, directions to the employer geographic location, supervisor information, and estimate total pay for the selected day. Schedule data may further comprise a set of open and/or otherwise available shifts for an employee, shift reminders with details, and special requests for a supervisor for an upcoming shift.

As used herein, "scheduling" entails setting an employee's days and hours scheduled to work, employee assignments, employee rate of pay (with estimated gross pay for pay period), and any specific duties/responsibilities needed for certain shifts (e.g., if errands need to be run, appointments made, and the like).

As used herein, a "remote location" is typically a location at which an employee supervisor's or employer's means of accessing and viewing schedules and time clock in/out data exists.

Referring generally to FIG. 1, a system for tracking time for employee 200 comprises one or more geographic location aware devices 10 and one or more remote trackers 20. In most situations, employee 200 is a contract or similar employee whose work will be for third party employer 210 who actually pays all or a portion of wages for employee 200. For such situations, employer 202 and/or third party employer 201 may be provided with an employee profile for employee 200, which may comprise information for employee 200 such as photos, biographies, work experience, certifications, general information, and the like, or a combination thereof.

Referring additionally to FIG. 2, geographic location aware device 10 may be one or more hand held devices such as mobile phones, portable computing devices, custom hardware, or the like, or a combination thereof, as long as they comprise real time geographic location detector 11 and message generator 12 operatively in communication with real time geographic location detector 11, where message generator 12 is configured to generate a time and location message. The time and location message typically further comprises a unique identifier associated with employee 200 such as a mobile telephone number or other unique token.

Real time geographic location detector 11 is typically a GPS aware sensor able to determine a longitude/latitude of geographic location aware device 10 in real time. It typically comprises an ability to determine a date and time within a predetermined range, e.g. date-hours-minutes.

Geographic location aware device 10 further typically comprises transmitter 13 which is operatively able to access the time and location messages and configured to provide uni- or bi-directional data transmissions, typically through a digital data network such as a telephony data network or other data networking scheme such as wide-area networking (WiFi). Data transmission can be on a periodic basis, e.g. after a specified time period or timer has elapsed, on an event basis, e.g. when triggered by real time geographic location detector 11, or the like, or a combination thereof.

In certain embodiments, geographic location aware devices 10 further comprises processor 14 which can be programmed to interface with real time geographic location detector 11 and cause transmitter 13 to send a data message, such as one comprising a time and location message, to remote tracker 20 (FIG. 1) when processor 14, which is cooperatively in communication with real time geographic location detector 11 and/or message generator 12, determines that real time geographic location detector 11 has entered into or departed from geo-fenced area 100 (FIG. 1). In embodiments processor 14 can also receive data from a remote source such as remote tracker 20, which may be located at a single site such as first remote location 110 (FIG. 1), or a plurality remote trackers 20, which may be located at a single site such as first remote location 110 or a plurality of sites such as first remote location 110 and second remote location 120 (FIG. 1), and dynamically adjust data regarding a specific geo-fenced area 100 currently associated with geographic location aware device 10 and/or data related to employee 200. Detection of entry into, presence within, exit from, and/or presence outside geo-fence area 100 is typically an event that occurs for geo-fence areas 100 with a radius or other boundary of around 200 ft. As used herein, first remote location 110 and second remote location 120 may be different or the same remote location.

Optionally, but typically, geographic location aware device 10 comprises one or more displays 15 which allows employee 200 to interact with geographic location aware device 10. In certain embodiments, this interaction includes allowing employee 200 to provide input from employee 200 using one or more input sections associated with geographic location aware device 10, where the input section can be a physical keyboard, a virtual keyboard associated with display 15, voice data entry, or the like or a combination thereof.

Geographic location aware device 10 may further comprise employee software 16 operative within processor 14 where employee software 16 either comprises message generator 12 or is operatively in communication with message generator 12. If display 15 is present, employee software 16 is typically operatively in communication with display 15 and, if present, its input sections.

Referring back to FIG. 1, remote tracker 20 typically comprises one or more data receivers 21, which can be transceivers, one or more processors 22 operatively in communication with data receiver 21, and software 30 (not shown in the figures) operative in processor 22.

Data receiver 21 is complimentary to transmitter 13 with respect to data transmission methods, signaling, and protocols and is similarly configured to provide uni- or bi-directional data transmissions, also typically through a digital data network such as a telephony data network or other data networking scheme such as wide-area networking (WiFi).

Processor 22 can be a single or multiple CPU processor with random access memory and a data store, as those of ordinary skill in data processing arts understand, and may be an off-the-shelf computer, a specialized computer, or the like, or a combination thereof.

Software 30 (not shown in the figures) comprises received time and location message processing module 31 (not shown in the figures); prompting module 32 (not shown in the figures); total time calculation module 33 (not shown in the figures); and gross pay calculation module 34 (not shown in the figures). As those of ordinary skill in data processing arts understand, each of these modules may comprise a plurality of such modules and each module may comprise one or more submodules. The modules are typically operatively in communication with each by various means such as shared memory and/or access to shared data files on a data store, e.g. via database management software.

In the operation of exemplary embodiments, referring still to FIG. 1, an employee's time may be tracked and pay computed by providing employee 200 with one or more geographic location aware devices 10, each geographic location aware device 10 being location aware with respect to geographic spatial coordinates in real time and each comprising a unique identifier which is uniquely associated with employee 200. Typically, geographic location aware devices 10 are operable within and without an identifiable geo-fence area 100 and have received an identifier or other data defining a specific, identifiable geo-fence area 100 prior to employee 200 traveling to that identifiable geo-fence area 100. Additionally, geographic location aware devices 10 also typically receive and store scheduling information for that employee 200.

Creation of a first message to be sent to one or more remote trackers 20, which may be at first remote location 110 and/or second remote location 120, may be triggered from geographic location aware device 10 once geographic location aware device 10 has entered into geo-fence area 100, such as for a first time in a given date-time period, where the created first message comprises a description of geo-fence area 100 sufficient to identify that geo-fence area 100 and an event triggering time of the first message trigger, e.g. the date-time of such arrival, as well as the unique identifier of employee 200. Created first message may be sent to remote tracker 20 once geographic location aware device 10 has entered geo-fence area 100 for a first time or at a later time, as explained below.

Typically, creation of a second message to be sent to one or more remote trackers 20, which may be at first remote location 110 and/or second remote location 120, and is triggered by geographic location aware device 10 once geographic location aware device 10 is no longer within geo-fence area 100. The created second message is similar to the created first message but for the date-time information and typically comprises a departure time of the second message trigger as well as the unique identifier of employee 200.

Capturing a departure time at which geographic location aware device 10 is no longer within or proximate to geo-fence area 100 typically comprises capturing the time when geographic location aware device 10 first entered into geo-fence area 100, optionally with employee 200 provided annotation, and capturing a subsequent departure time when geographic location aware device 10 exited from geo-fence area 100. The annotation can include a prompt or other data from employee 200 and can be accomplished by numerous methods such as by opening a prompt for employee 200 to clock-in (i.e., have the prompt become visible on display 15 associated with geographic location aware device 10) and provide a signal to employee 200, which can be audible, visual, tactile, or the like, or a combination thereof.

Each of the first and second messages may comprise a text message, a datagram, or the like, or a combination thereof. Typically, the first message may be in the format of a text message, e.g. "[Employee identifier] has clocked in for their shift," a simple ping of clock-in time, a log entry of time on a schedule, or the like, or a combination thereof. The second message is typically in a similar format to the first message format. The format of the messages may be set by a supervisor's preference.

Triggering message creation of either the first or the second message may be effected by using a software application running in the background of geographic location aware device 10, e.g. a software application such as employee software 16 running in the background of geographic location aware device 10, where the software application is operatively in communication with real time geographic location detector 11 and operative to trigger message creation when geographic location aware device 10 enters geo-fence area 100 for the first time. This is also typically coordinated with a predetermined scheduled time, i.e. dependent on determining that the entry time is related to a scheduled entry time. Triggering may further comprise issuance of a user perceptible prompt on or in geographic location aware device 10, which can be audible, visual, tactile, or the like, or a combination thereof.

Transmission of the first and/or second messages may be in real time if geographic location aware device 10 detects the presence of a suitable data network or may be delayed by geographic location aware device 10 until it detects the presence of a suitable data network. Thus, if geographic location aware device 10 has access to a suitable data network communication, data transmission can occur in real time. However, although capturing of the arrival time typically occurs when employee software 16 captures the exact time employee 200 arrives for a shift into geo-fence area 100, at times geographic location aware device 10 may not have access to a suitable data network (telephony or internet) to effect a connection to remote tracker 20 at first remote location 110 or second remote location 120. In such situations, geographic location aware device 10 relays employee 200 data as soon as geographic location aware device 10 detects that it can access a suitable data network.

Typically, when employee 200 arrives for a shift an immediate log entry is generated by employee software 16 and/or software 30, where the log entry is maintained at remote site 110 and/or remote site 120. In addition, employee software 16 and/or software 30 may further generate a response to the clocking in by employee 200 such as a signal provided to employer 202, third-party employer 201, and/or employee 200 audible, where the signal is visual, tactile, or the like, or a combination thereof When employee 200 leaves geo-fence area 100, employee software 16 and/or software 30 may further generate a further log entry as well, along with response such as to indicate that employee 200 was clocking out, running errand, on break, or the like, or a combination thereof. This log entry is typically also maintained at remote site 110 and/or remote site 120

At predetermined intervals, which can be on demand or periodic, a time differential between the arrival time and the departure time as indicated in the first and the second messages is calculated by remote tracker 20 at first either remote location 110 or second remote location 120 or both using software 30 operative in processor 22 and the calculated time differential used to calculate a gross pay for employee 200 at a predetermined rate of pay. Gross pay for employee 200 is typically pre-determined and defined by a supervisor of employee 200 and may vary based on shift and third-party employer 201 characteristics.

In certain embodiments, the arrival time, departure time, geo-fence identity, employee identifying data, and gross pay for employee 200 may be provided to, and adjusted or approved by, a third party. Typically, each shift is logged as described above for approval by employer 202 and/or third-party employer 201. At end of pay period (which can be one day, one week, two weeks, or the like) a report is generated with total hours for all employees. Once approved, it may be submitted to a third party payroll system which processes payroll for such employees.

A third party such as third party employer 201 can modify the gross pay by, e.g., displaying the gross pay on a user perceptible device such as a computer display to the supervisor at conclusion of pay period. This is typically calculated by "rate*hours worked." Variables such as overtime, reimbursements and bonuses can be adjusted by the supervisor. Although third party employer 201 would typically never adjust gross pay, alerts can be set, e.g. if gross pay exceeds pre-set parameters (set by supervisor). An example would be if supervisor inadvertently set rate as $140 instead of $14 and their pay for week exceeded the allowable limit. The supervisor would be notified and would need to manually approve if not a mistake, and supervisor fix/re-submit if changes needed to be made.

In addition, third party employer 201 may be allowed to modify the calculated gross pay. By way of example and not limitation, such modification may comprise approving the gross pay, adjusting the gross pay such as based on a time differential caused by a predetermined reason for a departure time at which the geographic location aware device is no within the geo-fence, or disapproving the gross pay altogether.

The system may be aware that employee 200 is running an errand or otherwise to be paid for time not spent at third party employer 201 by, e.g., logging time from when employee 200 leaves geo-fence area 100 and then returns. Employee 200 typically designates whether or not employee 200 is on a reimbursable errand or on break for such time periods. The supervisor may set rates for travel/errand running and may further have total control of pay.

However, although there is an accurate account of substantially exact times spent within geo-fence area 100 and outside geo-fence area 100, typically time spent by employee 200 does not include time and/or location of employee 200 when not within geo-fence area 100.

Information may be provided to employee 200 by, e.g., using a software application such as an application that is part of other otherwise provided through employee software 16 that displays or otherwise makes total running time currently on shift information available to employee 200 on display 15. At a conclusion of a shift, display 15 can show total time and gross pay for that shift (which is typically not finalized until the supervisor approves it for final payroll but does give running total). At any time, employee 200 may also be able to view total hours worked for pay period (with gross pay) and view upcoming schedule and projected pay based on hours scheduled to work. Once payroll has been approved and submitted, employee 200 is typically notified of their gross pay, net pay and pay date.

A predetermined set of feedback information may be provided to employee 200 such as by transmitting such information from remote tracker 20 to geographic location aware device 10, where such the feedback information may comprise whether or not geographic location aware device 10 is present within a predefined identifiable geo-fence area 100. The predetermined set of feedback information may further comprise recorded or otherwise detected arrival time, departure time, geo-fence identity, and/or gross pay for such geo-fence identities.

In certain embodiments, employee 200 is provided with geographic location aware device 10 that is capable of bi-directional communications with remote tracker 20. Employee 200 may be allowed to communicate data other than the triggered uni- or bi-directional data transmissions with remote tracker 20 using geographic location aware device 10. This may include using a communications interface such as messaging or SMS text communication if no internet connection is available. If through employee software 16, communication between a supervisor or fellow employees is typically logged and archived. In this manner, employee 200 may be allowed to exchange communications with first remote location 110 or second remote location 120 where such communication may comprise scheduling information for employee 200; a notification sent to or from employee 200 or remote tracker 20 that employee 200 is running late with respect to a specific schedule and specific geo-fenced area 100; employee 200 calling in for a shift according to with respect to a specific schedule and specific geo-fenced area 100; employee 200 requesting time off; requesting employee 200 appear at a specific geo-fenced area 100 according to a specific schedule; an adjustment to a schedule; or the like; or a combination thereof.

In certain embodiments, software 30 may cause employer 202 and/or third party employer 201 to be notified that employee 200 has not arrived within or departed from geo-fence area 100 when scheduled or otherwise expected and/or that employee 200 will be running late or miss a shift altogether. Additionally, employer 202 and/or third party employer 201 may be notified that employee 200 has or has not met parameters set by employer 202 and/or third party employer 201. Employer 202 or third party employer 201 may be notified that employee 200 has not arrived or departed when expected by using pre-set parameters set by a supervisor or employer 202.

These notifications may be tactile, audible, and/or visual such as by using a visual indicator when notifying employer 202 and/or third party employer 201 that employee 200 has or has not met parameters set by employer 202 and/or third party employer 201.

Additionally, in certain embodiments employee 200 can view their profile and take actions such as modify a set of employee information present within the employee profile, the set of employee information comprising shift notification parameters, geographic location availability, time availability, and services provided. Employee 200 can typically access/register their profile via their phone, tablet or desktop. They may submit photos, bios and general information. Profiles and profile changes are typically to be approved by an administrator. Profiles are also typically not searchable by the general public. Individual profiles are sent to prospective employers directly by admin through software application on mobile device or a url texted/emailed to employer.

Especially where employee 200 is engaged by third-party employer 201, employer 202 and/or third-party employer 201 may be provided with a total of hours and costs, e.g. expected costs and/or actual costs, associated with employee 200 for a predetermined time frame once software 30 has calculated such data, either at a predetermined time or on demand.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A method for tracking an employee's time, comprising:
   a. providing an employee with a portable geographic location aware device, the portable geographic location aware device operable within and able to recognize that it is in an identifiable geo-fence area, the geographic location aware device associated with a unique employee;
   b. triggering creation of a first message to be sent to a remote location by the portable geographic location aware device once the portable geographic location aware device has entered into an inner boundary of the geo-fence area for a first time, the first message comprising an arrival time into the inner boundary of the geo-fence area of the first message trigger, an identifier of the geo-fence area, and an employee identifier;
   c. triggering creation a second message to be sent to the remote location by the portable geographic location aware device once the geographic location aware device is no longer within the geo-fence area, the second message comprising a departure time from the inner boundary of the geo-fence area of the first message trigger, the identifier of the geo-fence area, and the employee identifier;
   d. storing the first message or the second message in the portable geographic location aware device portable geographic location aware device until a suitable data network is available to the portable geographic location aware device;
   e. transmitting the first message and the second message from the portable geographic location aware device to a remote tracker located at the remote location once the suitable data network is available;
   f. calculating a time differential between the arrival time and the departure time;
   g. allowing an employer to review and adjust the time differential; and
   h. using the calculated time differential to calculate a gross pay for the employee at a predetermined rate of pay.

2. The method for tracking an employee's time of claim 1, wherein the remote location comprises a first remote location and a second remote location, each with a remote tracker.

3. The method for tracking an employee's time of claim 1, further comprising providing the arrival time, departure time, geo-fence area identity, and gross pay to a third party.

4. The method for tracking an employee's time of claim 3, further comprising allowing the third party to modify the calculated gross pay.

5. The method for tracking an employee's time of claim 4, wherein the modification comprises approving the gross pay, adjusting the gross pay, or disapproving the gross pay.

6. The method for tracking an employee's time of claim 5, wherein the modification comprises adjusting the gross pay based on a time differential caused by a predetermined reason for a departure time at which the geographic location aware device is no within the geo-fence area.

7. The method for tracking an employee's time of claim 1, further comprising providing a predetermined set of feedback information to the employee, the feedback information comprising a notification in real-time as to whether or not the geographic location aware device is present within the identifiable geo-fence area.

8. The method for tracking an employee's time of claim 1, further comprising:
   a. providing the employee with an electronic communicator capable of communicating with the remote location; and
   b. allowing the employee to communicate with the remote location using the electronic communicator.

9. The method for tracking an employee's time of claim 8, where the communication comprises scheduling information, a notification of running late, a calling in for a shift, a request for time off, a request for an appearance by the employee at the identifiable geo-fence area, an adjustment to a schedule, or a link to a predetermined set of employer information for a selected day.

10. The method for tracking an employee's time of claim 1, further comprising:
    a. providing an employee profile to the employee; and
    b. allowing the employee to modify a set of employee information present within the employee profile, the set of employee information comprising shift notification parameters, geographic location availability, time availability, and services provided.

11. The method for tracking an employee's time of claim 1, further comprising notifying an employer that the employee has not arrived within or departed from the geo-fence area when expected or that the employee has or has not met parameters set by the employer.

12. The method for tracking an employee's time of claim 11, further comprising using a visual indicator when notifying an employer that the employee has not arrived within or departed from the geo-fence area when expected or that the employee has or has not met parameters set by the employer.

13. The method for tracking an employee's time of claim 1, further comprising providing an employer with a total of hours and costs associated with an employee for a predetermined time frame.

14. The method for tracking an employee's time of claim 1, wherein:

a. triggering creation of the first message is effected by using a software application running in the background of the geographic location aware device, the software application operatively in communication with a real time geographic location detector and operative to trigger message creation when the real time geographic location detector detects that the geographic location aware device has entered into the predetermined geographic location for the first time at a time coordinated with a predetermined scheduled time; and b. triggering creation of the first message further comprises issuance of a user perceptible prompt on the geographic location aware device.

15. The method for tracking an employee's time of claim 1, wherein capturing a departure time at which the geographic location aware device is no longer within the predetermined geographic location comprises capturing a departure time.

16. A system for tracking an employee's time, comprising:
a. an employee portable geographic location aware device, comprising:
i. a housing;
ii. a real time geographic location detector disposed within the housing;
iii. a message generator disposed within the housing and operatively connected to the real time geographic location detector, the message generator configured to create a time and location message when the real time geographic location detector enters into or departs from a geo-fence area; and
iv. a transmitter disposed within the housing and operatively connected to the message generator; and
b. a remote tracker, comprising:
i. a data receiver;
ii. a processor operatively connected to the receiver; and
iii. software operative in the processor, the software comprising:
1. a received time and location message processing module;
2. a prompting module;
3. an employee scheduler comprising:
a. an employee identifier;
b. a set of dates, times, and identifiable geo-fence areas associated with the employee identifier; and
c. a schedule verifier;
4. a total time calculation module;
5. a total time adjustment module; and
6. a gross pay calculation module operative to calculate gross pay using total time information from the total time calculation module as adjusted by the total time adjustment module.

17. The system for tracking an employee's time of claim 16, further comprising a display.

18. The system for tracking an employee's time of claim 17, further comprising an input section.

19. The system for tracking an employee's time of claim 16, wherein the geographic location aware device comprises a smart phone, a computer, a laptop, or a tablet.

* * * * *